(12) United States Patent
King et al.

(10) Patent No.: US 10,192,456 B2
(45) Date of Patent: Jan. 29, 2019

(54) STIMULATING ONLINE DISCUSSION IN INTERACTIVE LEARNING ENVIRONMENTS

(71) Applicants: Gary King, Brookline, MA (US); Eric Mazur, Lincoln, MA (US); Kelly Miller, Cambridge, MA (US); Brian Lukoff, Austin, TX (US)

(72) Inventors: Gary King, Brookline, MA (US); Eric Mazur, Lincoln, MA (US); Kelly Miller, Cambridge, MA (US); Brian Lukoff, Austin, TX (US)

(73) Assignee: President And Fellows of Harvard College, Cambridge, MA (US)

( * ) Notice: Subject to any disclaimer, the term of this patent is extended or adjusted under 35 U.S.C. 154(b) by 72 days.

(21) Appl. No.: 15/365,004

(22) Filed: Nov. 30, 2016

(65) Prior Publication Data

US 2017/0154541 A1 Jun. 1, 2017

Related U.S. Application Data

(60) Provisional application No. 62/261,387, filed on Dec. 1, 2015, provisional application No. 62/261,397, filed on Dec. 1, 2015, provisional application No. 62/261,398, filed on Dec. 1, 2015, provisional application No. 62/261,400, filed on Dec. 1, 2015.

(51) Int. Cl.
| | | |
|---|---|---|
| *G09B 5/02* | (2006.01) | |
| *G09B 3/00* | (2006.01) | |
| *G06F 17/24* | (2006.01) | |
| *G09B 7/02* | (2006.01) | |
| *G06N 99/00* | (2010.01) | |
| *G06F 17/28* | (2006.01) | |
| *G09B 5/12* | (2006.01) | |

(52) U.S. Cl.
CPC ............. *G09B 5/02* (2013.01); *G06F 17/241* (2013.01); *G06F 17/28* (2013.01); *G06N 99/005* (2013.01); *G09B 5/12* (2013.01); *G09B 7/02* (2013.01)

(58) Field of Classification Search
CPC .......... G09B 7/02; G09B 5/02; G06N 99/005; G06N 3/02; G06N 5/00; G06N 7/02; G06F 17/241; G06F 17/30864; G06Q 30/02; G05B 13/00
See application file for complete search history.

(56) References Cited

U.S. PATENT DOCUMENTS

| | | | | |
|---|---|---|---|---|
| 4,996,642 A * | 2/1991 | Hey | .................... | G06F 17/3061 273/161 |
| 5,724,567 A * | 3/1998 | Rose | ................. | G06F 17/30699 707/999.002 |
| 6,209,100 B1 * | 3/2001 | Robertson | .............. | G06Q 10/10 705/74 |
| 6,789,047 B1 * | 9/2004 | Woodson | ......... | G06Q 10/06398 434/118 |

(Continued)

*Primary Examiner* — Milap Shah
(74) *Attorney, Agent, or Firm* — Morgan, Lewis & Bockius, LLP (57) ABSTRACT

In various embodiments, online discussions in connection with an educational resource are improved by analyzing annotations made by students assigned to a discussion group to identify high-quality annotations likely to generate responses and stimulate discussion threads and by making the identified annotations visible to students not assigned to the discussion group.

24 Claims, 3 Drawing Sheets

(56) References Cited

U.S. PATENT DOCUMENTS

| | | | | |
|---|---|---|---|---|
| 7,197,470 | B1* | 3/2007 | Arnett | G06F 21/31 705/7.29 |
| 7,810,033 | B2* | 10/2010 | Cordes | G06F 17/211 715/700 |
| 8,225,348 | B2* | 7/2012 | Morris | H04N 7/17318 725/37 |
| 8,261,193 | B1* | 9/2012 | Alur | G06Q 10/101 715/742 |
| 8,311,792 | B1* | 11/2012 | Podgorny | G09B 19/00 434/107 |
| 8,806,352 | B2* | 8/2014 | Sitrick | G06Q 10/101 715/751 |
| 9,330,366 | B2* | 5/2016 | Sitrick | G06Q 10/0631 |
| 9,542,669 | B1* | 1/2017 | Browning | G06Q 10/109 |
| 9,619,483 | B1* | 4/2017 | Robinson | G06F 17/30206 |
| 9,740,785 | B1* | 8/2017 | Robinson | G06F 17/30867 |
| 2003/0014311 | A1* | 1/2003 | Chua | G06Q 30/02 705/14.35 |
| 2003/0138758 | A1* | 7/2003 | Burstein | G06F 17/27 434/169 |
| 2005/0198128 | A1* | 9/2005 | Anderson | G06F 17/24 709/204 |
| 2005/0234958 | A1* | 10/2005 | Sipusic | G06F 3/0485 |
| 2006/0026593 | A1* | 2/2006 | Canning | G06F 9/4843 718/100 |
| 2006/0112392 | A1* | 5/2006 | Zhang | H04L 51/26 718/102 |
| 2007/0055926 | A1* | 3/2007 | Christiansen | G06F 17/241 715/210 |
| 2007/0067405 | A1* | 3/2007 | Eliovson | G06Q 10/10 709/206 |
| 2007/0099162 | A1* | 5/2007 | Sekhar | G06Q 30/02 434/323 |
| 2007/0160963 | A1* | 7/2007 | Diaz | G06Q 10/10 434/219 |
| 2007/0283403 | A1* | 12/2007 | Eklund, II | G09B 5/06 725/117 |
| 2009/0035733 | A1* | 2/2009 | Meitar | G09B 7/00 434/118 |
| 2009/0063991 | A1* | 3/2009 | Baron | G06Q 10/10 715/751 |
| 2009/0311658 | A1* | 12/2009 | Polivka | G09B 5/00 434/350 |
| 2011/0041082 | A1* | 2/2011 | Nguyen | G06Q 10/10 715/752 |
| 2011/0179130 | A1* | 7/2011 | Sapek | G06Q 10/10 709/206 |
| 2011/0231363 | A1* | 9/2011 | Rathod | G06F 17/30867 707/609 |
| 2011/0314007 | A1* | 12/2011 | Dassa | G06F 17/30893 707/723 |
| 2012/0030729 | A1* | 2/2012 | Schwartz | G06Q 10/0633 726/1 |
| 2012/0141968 | A1* | 6/2012 | Li | G09B 7/04 434/350 |
| 2012/0196267 | A1* | 8/2012 | Hur | G06Q 10/10 434/353 |
| 2012/0197871 | A1* | 8/2012 | Mandel | G06F 17/30994 707/722 |
| 2012/0215773 | A1* | 8/2012 | Si | G06F 17/30864 707/723 |
| 2012/0218305 | A1* | 8/2012 | Patterson | G06F 17/2235 345/652 |
| 2013/0268536 | A1* | 10/2013 | Nachiappan | G06Q 50/01 707/741 |
| 2013/0339443 | A1* | 12/2013 | Goldman | H04L 65/403 709/204 |
| 2014/0004495 | A1* | 1/2014 | Singh | G09B 7/02 434/322 |
| 2014/0106318 | A1* | 4/2014 | Wright | G09B 19/00 434/219 |
| 2015/0079575 | A1* | 3/2015 | Couch | G09B 5/02 434/350 |
| 2015/0127628 | A1* | 5/2015 | Rathod | H04W 4/21 707/710 |
| 2015/0161903 | A1* | 6/2015 | Colliander | G09B 7/06 434/350 |
| 2015/0209677 | A1* | 7/2015 | O'Brien | A63F 13/792 463/25 |
| 2016/0147399 | A1* | 5/2016 | Berajawala | G06F 17/241 715/753 |
| 2016/0170968 | A1* | 6/2016 | Allen | G06F 17/2765 434/322 |
| 2016/0188600 | A1* | 6/2016 | Owens | G06Q 30/02 707/734 |
| 2017/0154539 | A1* | 6/2017 | King | G09B 5/02 |
| 2017/0154543 | A1* | 6/2017 | King | G09B 7/02 |

* cited by examiner

STIMULATING ONLINE DISCUSSION IN INTERACTIVE LEARNING ENVIRONMENTS

RELATED APPLICATIONS

This application claims the benefit of and priority to U.S. Provisional Patent Application No. 62/261,387, filed Dec. 1, 2015, U.S. Provisional Patent Application No. 62/261,397, filed Dec. 1, 2015, U.S. Provisional Patent Application No. 62/261,398, filed Dec. 1, 2015, and U.S. Provisional Patent Application No. 62/261,400, filed Dec. 1, 2015, the entire disclosure of each of which is hereby incorporated herein by reference.

TECHNICAL FIELD

In various embodiments, the present invention relates generally to online learning, and in particular to resources for enhancing and personalizing learning experiences involving an online component.

BACKGROUND

As digital textbooks inexorably replace traditional printed media, and online social resources such as discussion boards supplement classroom instruction, teachers and publishers are finding new opportunities for engaging students. Students with access to digital materials may annotate a shared digital version of a class text or videos, ask and answer each other's questions, and interact with the teaching staff while reading. The advantages are substantial: instead of waiting days until office hours to get past a conceptual roadblock, students can ask a question at any time and often get a response within minutes. Student motivation is enhanced through online interactions that enable them to share interest and knowledge.

In increasing number of classrooms, when students are given reading material as homework assignments, it is in digital format and they are allowed to highlight a passage and add a comment or question. Other students (and the teaching staff) can then see this immediately and can answer questions or add their own comments (in an interaction that looks roughly as it does on Facebook). Students stumped about some problem can easily address it, whatever the hour, if other students are reading at the same time or soon after. When students are assigned videos, they may now be able to annotate the timeline, with comments and interactions following.

Research has shown that students who engage in high levels of meaningful online discussion using annotation systems have higher normalized learning gain scores than students who participate just to fulfill basic requirements. Moreover, providing students with incentives to complete the readings thoughtfully and feedback on their annotations helps ensure that students do the assigned readings on time. Overall, when integrated properly into the classroom experience, annotations and their evaluation contribute meaningfully to student learning.

One bar to effective exploitation of online resources and discussion forums is hesitation to initiate a discussion. Students may be chary of being the first to post a comment or question, and annotations that merely request clarification or an answer may not contribute to robust discussion. Motivating students not only to post annotations but to initiate meaningful online discourse and debate remains a challenge. Thus, there is a need for techniques and systems for the encouragement and evaluation of annotations during participants' use of online educational resources without significant increase to the workload of the instructor and/or other course managers.

SUMMARY

Embodiments of the invention stimulate discussions in online forums and within educational resources (e.g., online textbooks) adapted to accept and publicly display student annotations. In various embodiments, "high-quality" posts, messages, or other annotations (collectively, "annotations") from one or more concurrent or previous classes or sections are used as seeds to promote productive, generative discussions in another class or section. As used herein, the term "high-quality annotations" means annotations that are likely to generate responses and stimulate discussion threads, and "discussion" or "thread" means a sequence of online annotations pertaining to a topic or directed toward a portion of a resource (e.g., a paragraph, section or chapter of a book), and a "discussion" may contain one or more "threads." "Discussion media" refers to online platforms where participants may post annotations, e.g., a discussion board or annotatable portion of an online textbook. Research has shown that seeding discussions with high-quality questions from a discussion from a previous class or section both improves the overall quality of the annotations and promotes a higher proportion of generative and argumentative discussion threads. Generative and argumentative discussions have been shown to be the most effective in promoting learning. In accordance herewith, high-quality annotations are detected automatically, and once identified, are used to seed discussions at the class level and/or the section level.

High-quality annotations may be selected historically, i.e., from earlier classes and/or earlier and/or concurrent sections using a particular resource, by simple ranking i.e., examining discussion lengths and, for a particular topic, resource, or portion of a resource, identifying threads that exceed a length threshold (or which are the longest for the particular topic, resource or resource portion). The original annotation that stimulated the discussion is then selected. Thus, high-quality annotations from a previous session of a class may be used to seed discussions in a current session.

High-quality annotations may also be selected on a current basis using a machine-learning model optimized to predict and select the annotations most likely to generate good, informative discussion. For example, high-quality annotations may be identified in one section and imported into the discussion media of other sections within the same class; as a result, different sections may "cross-pollinate" each other so that all students benefit from high-quality annotations pertaining to the same resource used across sections. It has been found that limiting the size of the online discussion to 20-40 students optimizes both the quality and length of the discussion. In some embodiments, classes are automatically divided into smaller sections of students for purposes of discussion. To standardize the discussion experience across sections, an automatic seeding approach extracts features from annotations found to lead to long and generative discussions in one class or section and, using these features, builds a model to identify targeted seed annotations made in a particular section that are likely to generate good, informative discussion threads across all sections. Because sections need not have organizational or administrative significance outside the operation of the invention, they may be monitored for their success in engaging in discussions, and students may be grouped into sections that better optimize student engagement, collaboration, and learning.

In various embodiments, the model identifies seed annotations before the threads have emerged and, in real-time, automatically embeds these into discussion media in the other sections of the class. This approach provides the benefit of smaller discussion sections without losing the benefit of insightful annotations made in another section. The model used to predict and select the best seed annotations may be iterative, adaptive, and not based on predetermined features. The model may employ a dynamic feature-extraction process that changes based on the successful identification of seeds from one portion of a resource to the next. The model may evaluate the success of each seed in stimulating generative threads by analyzing both the length and average quality of the thread that ultimately emerge from each seed, with quality defined above and scored as described below. Based on the success of the seeds in each resource or resource portion, feature extraction may be refined so that more predictive features are used with each successive resource or resource portion. For example, feature extraction may be refined from one chapter to the next so that more predictive features are used to choose better seeds. The chosen seeds are automatically embedded—i.e., introduced into discussion media or as postings to an online educational resource—into all sections of the course simultaneously so that all students benefit from participation in the generative threads that emerge.

Embodiments of the invention may also analyze discussions in class-related online forums to identify likely sources of student confusion. Particularly when student annotations relate to an online educational resource, embodiments of the invention may assemble a report with clickable links to the annotations and/or pertinent portions of the resource. In various embodiments, the invention utilizes the identified "high-quality" annotations, which are likely to generate responses and stimulate discussion threads, as suggestive of areas of student confusion.

As utilized herein, the term "annotation" refers to any feedback supplied by a student in response to and/or associated with an educational resource. Annotations may include, for example, posts and/or messages in electronic discussion forums, answers to embedded questions, comments related to specific passages of the resource, or both. As utilized herein, the term "class" refers to a gathering of "users," "participants," or "students" led by one or more "instructors." Participants need not be in the same room as each other or the instructor, so classes encompass distance learning situations. In addition, participants need not be students; they might be employees participating in a corporate training event or workshop participants attending an educational workshop. Accordingly, the terms "participant" and "student" are used interchangeably herein, it being understood that the utility of the invention is not limited to students in classroom environments. In addition, the term "instructor" used herein is not limited to a teacher or a professor in the classroom; the "instructor" may be a facilitator in a corporate event or in any group pursuing a pedagogical or intellectual endeavor.

In an aspect, embodiments of the invention feature a method of improving online discussions in connection with an educational resource provided to students over network-connected devices. In a step (a), an interactive educational resource is distributed over a network to a plurality of student devices. The student devices are associated with students currently enrolled in a class utilizing the educational resource. In a step (b), an online discussion for receiving and making visible, to student devices assigned to a discussion group, annotations concerning the educational resource received by the discussion server from the student devices assigned to the discussion group is hosted at a discussion server. In a step (c), annotations are computationally analyzed to identify high-quality annotations likely to generate responses and stimulate discussion threads. In a step (d), the identified annotations are made visible to student devices associated with students who are not assigned to the discussion group.

Embodiments of the invention may include one or more of the following in any of a variety of combinations. Prior to step (c), the method may include (i) receiving an initial set of annotations at the discussion server, each of the initial set of annotations having a discussion thread associated therewith, wherein at least a portion of the initial set of annotations constitutes a training set, (ii) extracting portions of annotations within the training set, thereby producing a plurality of seed features, and (iii) computationally deriving, from the seed features, one or more evaluation features predictive of thread lengths of discussion threads associated with annotations in the training set. Step (c) may include, consist essentially of, or consist of using a machine-learning model to predict a thread length (and/or one or more other quality metrics) associated with each annotation based on the one or more evaluation features. The model may be predictive in accordance with a prediction algorithm and may be generated by steps including, consisting essentially of, or consisting of (i) dividing the initial set of annotations into the training set and a testing set, each of the training set and the testing set comprising a plurality of annotations and thread lengths (and/or one or more other quality metrics) associated therewith, and (ii) identifying the one or more evaluation features based on predictive reliability in accordance with the prediction algorithm. Thread lengths (and/or one or more other quality metrics) for one or more annotations within the testing set may be computationally predicted based on the one or more evaluation features. Parameters of the model may be adjusted based on the predictions, for example, prior to computationally analyzing annotations not within the testing set or training set to identify high-quality annotations. The prediction algorithm may include, consist essentially of, or consist of a classification tree. The prediction algorithm may include, consist essentially of, or consist of a random forest. The random forest may include, consist essentially of, or consist of a plurality of regression trees. Producing the plurality of seed features may include, consist essentially of, or consist of applying natural-language processing to annotations within the training set.

The discussion server may host a plurality of simultaneous discussions each visible only to a discussion group including, consisting essentially of, or consisting of a subset of the students enrolled in the class. The annotations may be analyzed within at least one discussion group and identified annotations within one discussion group may be made visible to student devices associated with students who are in at least one of the other discussion groups. The discussion group may correspond to a first session of the class and at least some of the students who are not in the discussion group may be enrolled in a second, subsequent session of the class. The method may include, after step (c), (i) computationally identifying clusters of high-quality annotations relating to the same portion or related portions of the educational resource, (ii) for each cluster, extracting and summarizing text from the annotations indicative of a topic to which the annotations relate, and (iii) combining, in an electronically represented document, the extracted and summarized text and (a) at least some of the annotations and the portion or portions of the educational resource or (b) clickable links thereto. The text from each of the clusters may be represented in the document in the form of a panel. The method may include, after step (d), redefining the discussion group to include one or more students not assigned to the discussion group in step (b).

In another aspect, embodiments of the invention feature an educational system that includes, consists essentially of, or consists of a plurality of student devices for executing an interactive educational resource received over a network, a student database, a resource server in electronic communication with the student devices, a discussion server, and an analysis module. The student devices are configured to receive student annotations associated with the educational resource and transmit at least some of the annotations to the discussion server. The resource server includes, consists essentially of, or consists of a communication module. The resource server is configured to make the resource available to student devices associated with students enrolled in a class. The discussion server is in electronic communication with the student devices. The discussion server receives and makes visible, to student devices assigned to a discussion group in the student database, annotations concerning the educational resource received from the student devices assigned to the discussion group. The analysis module computationally analyzes annotations to identify high-quality annotations likely to generate responses and stimulate discussion threads. The discussion server is configured to make the identified annotations visible to student devices associated with students who are not assigned to the discussion group.

Embodiments of the invention may include one or more of the following in any of a variety of combinations. The analysis module may be configured to (i) extract portions of annotations within a training set of annotations, thereby producing a plurality of seed features, and (ii) computationally derive, from the seed features, one or more evaluation features predictive of thread lengths of discussion threads (and/or one or more other quality metrics) associated with annotations in the training set. The analysis module may use a machine-learning model to predict a thread length (and/or one or more other quality metrics) associated with each annotation based on the one or more evaluation features. The model may be predictive in accordance with a prediction algorithm and may be generated by steps including, consisting essentially of, or consisting of (i) dividing an initial set of annotations into the training set and a testing set, each of the training set and the testing set comprising a plurality of annotations and thread lengths (and/or one or more other quality metrics) associated therewith, and (ii) identifying the one or more evaluation features based on predictive reliability in accordance with the prediction algorithm. The analysis module may be configured to (i) computationally predict, based on the one or more evaluation features, thread lengths (and/or one or more other quality metrics) for one or more annotations within the testing set, and adjust parameters of the model based on the predictions. The prediction algorithm may include, consist essentially of, or consist of a classification tree. The prediction algorithm may include, consist essentially of, or consist of a random forest. The random forest may include, consist essentially of, or consist of a plurality of regression trees. The analysis module may be configured to produce the plurality of seed features by applying natural-language processing to annotations within the training set.

The discussion server may host a plurality of simultaneous discussions each visible only to a discussion group including, consisting essentially of, or consisting of a subset of the students enrolled in the class. The analysis module may be configured to analyze annotations within at least one discussion group. The discussion server may make identified annotations within one discussion group visible to student devices associated with students who are in at least one of the other discussion groups. The discussion group may correspond to a first session of the class and at least some of the students who are not in the discussion group may be enrolled in a second, subsequent session of the class. The analysis module may be configured to (i) computationally identify clusters of high-quality annotations relating to the same portion or related portions of the educational resource, (ii) for each cluster, extract and summarize text from the annotations indicative of a topic to which the annotations relate, and (iii) combine, in an electronically represented document, the extracted and summarized text and (a) at least some of the annotations and the portion or portions of the educational resource or (b) clickable links thereto. The text from each of the clusters may be represented in the document in the form of a panel.

In yet another aspect, embodiments of the invention feature a method of identifying and summarizing subject matter for improving discussions in connection with an educational resource provided to students over network-connected devices. In a step (a), an interactive educational resource is distributed over a network to a plurality of student devices. The student devices are associated with students currently enrolled in a class utilizing the educational resource. In a step (b), an online discussion for receiving and making visible, to student devices assigned to a discussion group, annotations concerning the educational resource received by the discussion server from the student devices assigned to the discussion group is hosted at a discussion server. In a step (c), annotations are computationally analyzed to identify high-quality annotations likely to generate responses and stimulate discussion threads. In a step (d), clusters of high-quality annotations relating to the same portion or related portions of the educational resource are computationally identified. In a step (e), for each cluster, text from the annotations indicative of a topic to which the annotations relate is extracted and/or summarized. In a step (f), the extracted and/or summarized text and (i) at least some of the annotations and the portion or portions of the educational resource or (ii) clickable links thereto are combined in an electronically represented document.

Embodiments of the invention may include one or more of the following in any of a variety of combinations. The method may include, prior to step (c), (i) receiving an initial set of annotations at the discussion server, each of the initial set of annotations having a discussion thread associated therewith, wherein at least a portion of the initial set of annotations constitutes a training set, (ii) extracting portions of annotations within the training set, thereby producing a plurality of seed features, and (iii) computationally deriving, from the seed features, one or more evaluation features predictive of thread lengths of discussion threads (and/or one or more other quality metrics) associated with annotations in the training set. Step (c) may include, consist essentially of, or consist of using a machine-learning model to predict a thread length (and/or one or more other quality metrics) associated with each annotation based on the one or more evaluation features. The model may be predictive in accordance with a prediction algorithm and may be generated by steps including, consisting essentially of, or consisting of (i) dividing the initial set of annotations into the training set and a testing set, each of the training set and the testing set comprising a plurality of annotations and thread lengths (and/or one or more other quality metrics) associated therewith, and (ii) identifying the one or more evaluation features based on predictive reliability in accordance with the prediction algorithm. Thread lengths (and/or one or more other quality metrics) for one or more annotations within the testing set may be computationally predicted based on the one or more evaluation features. Parameters of the model may be adjusted based on the predictions, for example, prior to computationally analyzing annotations not within the testing set or training set to identify high-quality annotations. The prediction algorithm may include, consist essentially of, or consist of a classification tree. The prediction algorithm may include, consist essentially of, or consist of a random forest. The random forest may include, consist essentially of, or consist of a plurality of regression trees. Producing the plurality of seed features may include, consist essentially of, or consist of applying natural-language processing to annotations within the training set.

The text from each of the clusters may be represented in the document in the form of a panel. After step (c), the identified annotations may be made visible to student devices associated with students who are not assigned to the discussion group. The discussion server may host a plurality of simultaneous discussions each visible only to a discussion group including, consisting essentially of, or consisting of a subset of the students enrolled in the class. The annotations may be analyzed within each discussion group. One or more identified annotations within one discussion group may be made visible to student devices associated with students who are (i) in one or more of the other discussion groups, and/or (ii) not assigned to the discussion group. The discussion group may correspond to a first session of the class. The students who are not assigned to the discussion group may be enrolled in a second, subsequent session of the class.

In another aspect, embodiments of the invention feature an educational system that includes, consists essentially of, or consists of a plurality of student devices for executing an interactive educational resource received over a network, a student database, a resource server in electronic communication with the student devices, a discussion server, and an analysis module. The student devices are configured to receive student annotations associated with the educational resource and transmit at least some of the annotations to the discussion server. The resource server includes, consists essentially of, or consists of a communication module. The resource server is configured to make the resource available to student devices associated with students enrolled in a class. The discussion server is in electronic communication with the student devices. The discussion server receives and makes visible, to student devices assigned to a discussion group in the student database, annotations concerning the educational resource received from the student devices assigned to the discussion group. The analysis module is configured to (i) computationally analyze annotations to identify high-quality annotations likely to generate responses and stimulate discussion threads, (ii) computationally identify clusters of high-quality annotations relating to the same portion or related portions of the educational resource, (iii) for each cluster, extract and/or summarize text from the annotations indicative of a topic to which the annotations relate, and (iv) combine, in an electronically represented document, the extracted and/or summarized text and (a) at least some of the annotations and the portion or portions of the educational resource or (b) clickable links thereto.

Embodiments of the invention may include one or more of the following in any of a variety of combinations. The analysis module may be configured to (i) extract portions of annotations within a training set of annotations, thereby producing a plurality of seed features, and (ii) computationally derive, from the seed features, one or more evaluation features predictive of thread lengths of discussion threads (and/or one or more other quality metrics) associated with annotations in the training set. The analysis module may use a machine-learning model to predict a thread length (and/or one or more other quality metrics) associated with each annotation based on the one or more evaluation features. The model may be predictive in accordance with a prediction algorithm and may be generated by steps including, consisting essentially of, or consisting of (i) dividing an initial set of annotations into the training set and a testing set, each of the training set and the testing set comprising a plurality of annotations and thread lengths (and/or one or more other quality metrics) associated therewith, and (ii) identifying the one or more evaluation features based on predictive reliability in accordance with the prediction algorithm. The analysis module may be configured to (i) computationally predict, based on the one or more evaluation features, thread lengths (and/or one or more other quality metrics) for one or more annotations within the testing set, and adjust parameters of the model based on the predictions. The prediction algorithm may include, consist essentially of, or consist of a classification tree. The prediction algorithm may include, consist essentially of, or consist of a random forest. The random forest may include, consist essentially of, or consist of a plurality of regression trees. The analysis module may be configured to produce the plurality of seed features by applying natural-language processing to annotations within the training set.

The discussion server may be configured to make the identified annotations visible to student devices associated with students who are not assigned to the discussion group. The discussion server may host a plurality of simultaneous discussions each visible only to a discussion group including, consisting essentially of, or consisting of a subset of the students enrolled in the class. The analysis module may be configured to analyze annotations within each discussion group. The discussion server may make identified annotations within one discussion group visible to student devices associated with students who are (i) in one or more of the other discussion groups, and/or (ii) not assigned to the discussion group. The discussion group may correspond to a first session of the class. The students who are not assigned to the discussion group may be enrolled in a second, subsequent session of the class.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean ±10%, and in some embodiments, ±5%. The term "consists essentially of" means excluding other materials that contribute to function, unless otherwise defined herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
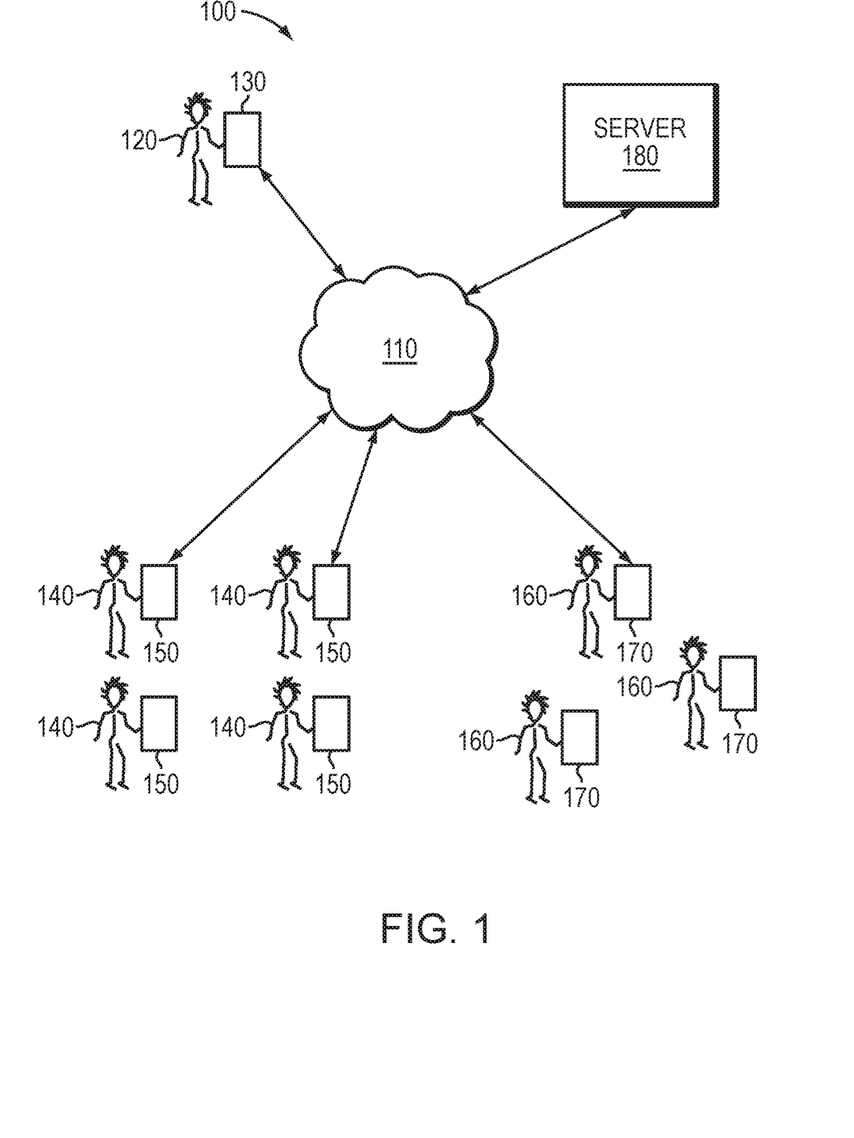
FIG. 1 is a schematic depiction of an educational environment in accordance with various embodiments of the invention.

FIG. 1 illustrates an exemplary educational environment 100 in accordance with embodiments of the present invention. As shown, within the environment 100, communication is established, via a network 110, among an instructor 120 utilizing an instructor device 130, various students 140 each utilizing a student device 150, one or more optional graders 160 each utilizing a grading device 170, and an educational system or server 180. Graders 160 may include or consist essentially of, for example, (1) staff graders, i.e., teaching assistants hand-grading student annotations with a research-based rubric, (2) peer graders who, in the process of learning about scoring rubrics used to evaluate annotations, score a subset of their peers' annotations through a calibration grading exercise (thus, one or more of the graders 160 may also be a student 140), and/or (3) dedicated human graders not enrolled in the class.

The network 110 may include or consist essentially of, for example, the Internet and/or one or more local-area networks (LANs) or wide-area networks (WANs). The terms "student device," "instructor device," and "grading device" as used herein broadly connote any electronic device or system facilitating wired and/or wireless bi-directional communications, and may include computers (e.g., laptop computers and/or desktop computers), handheld devices, or other personal communication devices. Handheld devices include, for example, smart phones or tablets capable of executing locally stored applications and supporting wireless communication and data transfer via the Internet or the public telecommunications infrastructure. Smart phones include, for example, IPHONES (available from Apple Inc., Cupertino, Calif.), BLACKBERRIES (available from RIM, Waterloo, Ontario, Canada), or any mobile phones equipped with the ANDROID platform (available from Google Inc., Mountain View, Calif.); tablets, such as the IPAD and KINDLE FIRE; and personal digital assistants (PDAs). The bi-directional communication and data transfer may take place via, for example, one or more of cellular telecommunication, a Wi-Fi LAN, a point-to-point Bluetooth connection, and/or an NFC communication.

Figure 2:
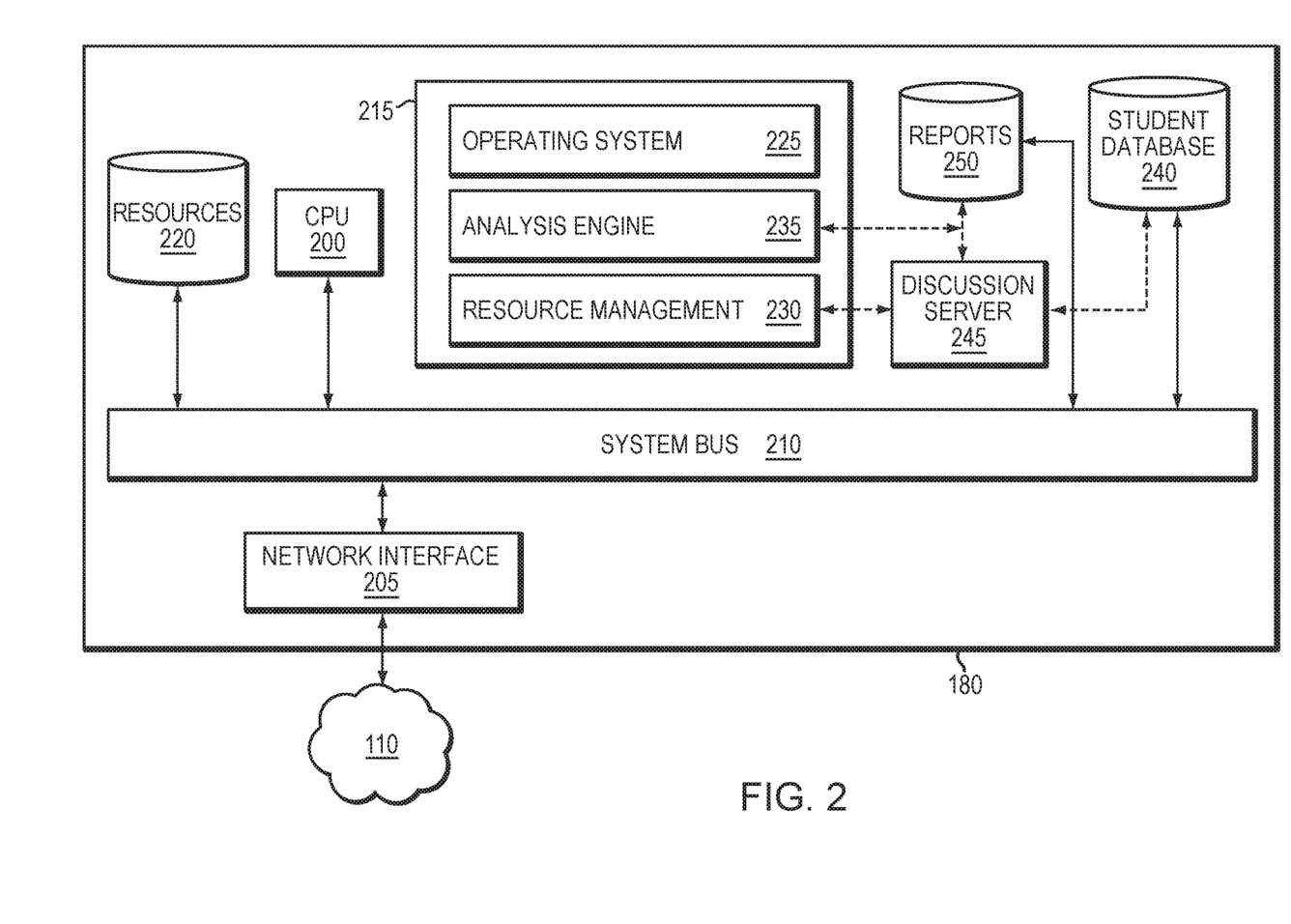
FIG. 2 is a block diagram of an educational server or system utilized in accordance with various embodiments of the invention.

FIG. 2 depicts a more detailed schematic of the server 180, which includes or consists essentially of a general-purpose computing device whose operation is directed by a computer processor, i.e., central processing unit (CPU) 200. The server 180 includes a network interface 205 that facilitates communication over the network 110, using hypertext transfer protocol (HTTP) or other suitable protocols. For example, the network interface 205 may include or consist essentially of one or more hardware interfaces enabling data communication via network 110, as well as a communications module for sending, receiving, and routing such communications within server 180 (e.g., via system bus 210). The server 180 further includes a bi-directional system bus 210, over which the system components communicate, a main (typically volatile) system memory 215, and a non-volatile mass storage device (such as one or more hard disks and/or optical storage units) 220, which may contain resources, such as digital textbooks and/or other educational resources, that may be delivered to the student devices 150.

The main memory 215 contains instructions, conceptually illustrated as a group of modules, which control the operation of the CPU 200 and its interaction with the other hardware components. An operating system 225 directs the execution of low-level, basic system functions such as memory allocation, file management and operation of mass storage devices 220. The operating system 225 may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

A resource-management module 230 is responsible for, e.g., allowing properly authenticated students 140 to access privileged educational resources via their devices 150, and for monitoring the students' interactions with these resources. The resource-management module 230 may also control and facilitate access to educational resources for the instructor 120 via the instructor device 130 and/or for the graders 160 via grading devices 170. It should be understood that resources provided to the student devices 150 need not reside physically within the server 180; the resource-management module 230 may obtain resources from other servers, or direct other servers (e.g., an educational publisher's server) to provide resources to student devices. It should further be understood that the access-control functions of the resource-management module 230 are well known to those skilled in the art of online educational platforms and, more generally, to access control for resources available online or via a private network.

In accordance with embodiments of the invention, an analysis engine (or "analysis module") 235 monitors student annotations and analyzes annotations to identify high-quality annotations. The server 180 may also maintain or have access to a student database 240 containing contact information for each student, including email addresses, phone numbers (e.g., to which text messages may be sent). The student database 240 may also maintain rosters of classes, sections, and students within each class section. In various embodiments of the invention, the server 180 may also incorporate a discussion hosting server 245 that supports a discussion platform and makes this available to students 140 via their devices 150. The discussion platform may be a server-hosted discussion board that operates autonomously, in the manner of a social-media platform, or may be associated with resources 220 in the manner of discussion boards maintained by online educational platforms such as edX or COURSERA. For example, server 245 may perform the functions of resource-management module 230 and facilitate access to resources 220 that have annotation fields into which students 140 may enter comments that server 245 organizes as annotation threads (or "discussion threads"). Server 245 may be part of the main server 180 or may be a separate device.

As mentioned previously, the analysis engine 235 monitors student annotations entered into the platform provided by hosting server 245, and analyzes these to identify high-quality annotations. This analysis may take place on a historical basis, e.g., by ranking annotations entered during a previous class session, or on a current basis, e.g., by predicting which current posts are likely to be high-quality. Each class section may interact with a separate discussion platform. When a high-quality post is identified, for example, from a prior class, hosting server 245 may post it to all relevant platforms (i.e., across all sections of the current class) to stimulate discussion. Similarly, when a high-quality post is identified in a section of the current class session, hosting server 245 may post it to the discussion platforms of all other sections.

The server 180 may also include, in various embodiments of the invention, a repository or database 250 that stores various reports related to the interactions of students 140, the instructor 120, and/or graders 160 with the resources 220 (and/or with content related thereto, such as student annotations). For example, the repository 250 may store grade reports generated by graders 160 or reports for the instructor 120 based on and/or highlighting questions, comments, and/or annotations generated by the students 140. For example, such reports may include links to annotations stored on the discussion server 245.

The analysis engine 235 may use high-quality annotations as the basis for generating interactive, editable "confusion reports" i.e., electronic documents that highlight and summarize what the students found the most confusing in the educational resource (or a portion thereof). The confusion reports may be stored in the repository 250 as electronic documents in any suitable format (e.g., as WORD documents, PDF documents, HTML files, etc.) for convenient retrieval and interactivity. For example, confusion reports may include links to annotations stored on discussion server 245. Analysis engine 235 may also parse identified annotations to locate key terms indicating the source of confusion and/or creating brief, automated summaries of a cluster of high-quality annotations relating to a particular topic.

Figure 3:
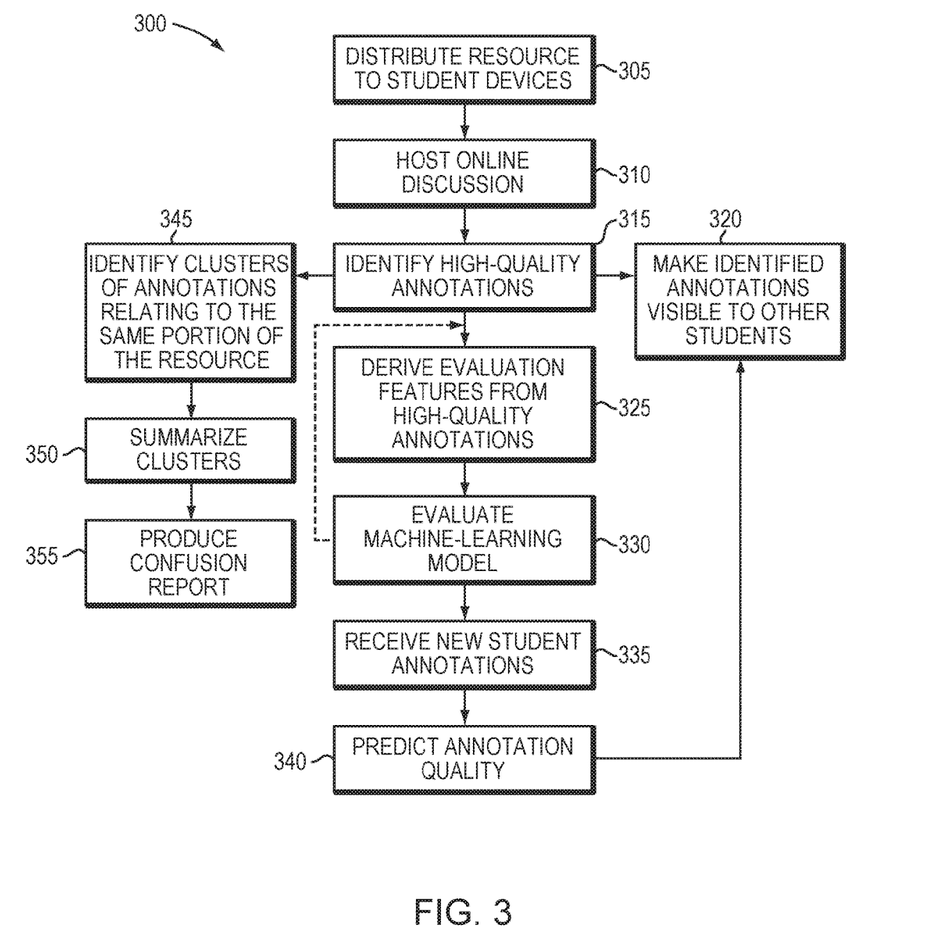
FIG. 3 is a flowchart of a technique of improving online and/or offline discussions in connection with an educational resource in accordance with various embodiments of the invention.

FIG. 3 depicts a method 300 for improving online discussions in connection with an educational resource in accordance with various embodiments of the present invention. In step 305, an educational resource or a portion thereof (e.g., from storage 220) is electronically distributed to one or more student devices 150 via network 110. The student devices 105 to which the resource is distributed may be associated with, for example, students 140 currently enrolled in a class utilizing the resource. During use of the educational resource (e.g., reading of one or more passages in an electronic textbook and/or answering questions related to the resource) by the students 140, the students 140 may supply annotations related to the resource via their student devices 150. In step 310, an online discussion is hosted at the discussion server 245 in order to receive the annotations and make them visible to at least a subset of students 140 utilizing the resource (e.g., students 140 enrolled in the class). For example, the online discussion may be configured as a plurality of discussion threads pertaining to various topics relevant to the educational resource. The class may be split into multiple different discussion groups each containing a subset of students 140 enrolled in the class, and each discussion group may have a dedicated online discussion and/or set of discussion threads dedicated and visible to only that discussion group. In various embodiments of the invention, a "discussion group" may correspond to a first session of a class utilizing the educational resource, and other discussion groups (or students not in the discussion group) correspond to subsequent sessions of the same class.

In step 315, the annotations within the online discussion (or portion thereof) dedicated to one of the discussion groups are computationally analyzed by analysis engine 235 to identify "high-quality" annotations, i.e., annotations likely to generate responses and thereby stimulate discussion threads, and/or annotations having high quality as evaluated in accordance with U.S. Provisional Application No. 62/261,398, filed on Dec. 1, 2015, and in U.S. patent application Ser. No. 15/365,014, entitled "AUTOMATED GRADING FOR INTERACTIVE LEARNING APPLICATIONS," filed concurrently herewith, the entire disclosure of each of which is incorporated by reference herein. For example, high-quality annotations may be annotations that result in long discussion threads (i.e., discussion threads having more than a predetermined number of annotations, or simply one or more of the longest threads in the online discussion) and/or discussion threads involving many different students (i.e., discussion threads eliciting annotations from more than a predetermined number of students in the discussion group, or simply one or more of the threads in the online discussions having the highest number of participating students). Of course, other indicia of discussion quality (such as average word length, word sophistication as indicated by, e.g., a statistical metric such as term frequency/inverse document frequency (TF/IDF)) may be utilized alternatively or in addition.

In step 320, once the high-quality annotations made by the discussion group are identified, the discussion server 245 makes those annotations visible to students not assigned to the discussion group. For example, the selected annotations may be utilized as "seed annotations" in the relevant portion(s) of the educational resource for one or more discussion groups of students 140 currently enrolled in the same class and/or for discussion groups corresponding to students 140 enrolled in one or more subsequent (i.e., later in time) sessions of the class. In other exemplary embodiments, the selected annotations may be displayed to students enrolled in different classes and/or different courses at the same educational institution or at or educational institutions different from the institution from which the annotations arose. Annotations made visible to students not assigned to the discussion group may be anonymized (i.e., any information identifying the student(s) generating the annotations may be removed) before such annotations are made visible to other students.

In various embodiments of the invention, annotations may also be optionally analyzed to generate a predictive model that identifies annotations as high-quality annotations even before all or portions of discussion thread(s) associated therewith emerge via student discussion. For example, annotations (e.g., those at or near the beginning of emerging discussion threads) may be analyzed using a machine-learning model to identify annotations and/or portions thereof that are predictive of high-quality discussion. In various embodiments, the model may utilize conventional natural-language processing techniques such as stemming, stop-word removal and/or part-of-speech tagging.

The machine-learning model may be trained utilizing high-quality annotations identified in step 315 and be subsequently utilized to predict whether new student annotations are high-quality even before discussions associated therewith has been continued or completed. For example, some or all of the high-quality annotations identified in step 315 may be used as a training set for a text-analytic regression procedure (e.g., logistic regression, classification tree, random forest classifier, etc.) that constitutes the machine-learning model. More generally, the machine-learning model may be any suitable analytic framework for analyzing text and making predictions based on a training set, including classification and regression trees (CART), neural networks, or other suitable framework. Machine-learning models are well-characterized in the art and may be implemented without undue experimentation.

For example, in various embodiments, the analysis engine 235 utilizes a random forest classifier as the basis for the machine-learning model. In one embodiment, high-quality annotations form a training set, and the discussion thread quality (e.g., thread length or other discussion quality metric) associated with each annotation is determined from the existing discussion. The thread quality values serve as category labels for the machine-learning model. Features from the high-quality annotations may be extracted from the text and one or, more preferably, an ensemble of classifiers is used to fit the model to predict the category labels from the annotation features. The annotation features, along with permutations and combinations thereof, form a set of candidate evaluation features.

In step 325 depicted in FIG. 3, the evaluation features with sufficient predictive reliability against the training set may be selected for use in the model. The predictive reliability of a feature may be deemed sufficient, for example, based on standard error, t value, p value or another statistical metric, for example, a minimum p value required for an annotation feature to qualify as an evaluation feature set at a standard level of 0.01 or less. (The p value reflects the probability that the feature has no predictive value.) Typically, the training set will have 100 or more entries each reflecting a thread length and/or thread-quality metric associated with an annotation.

In step 330, following creation of the model and feature selection using the training set, the performance of the model may be evaluated using a testing set composed of other high-quality annotations identified in step 315 (i.e., having known thread length and/or quality metrics associated therewith). For example, the false positive and false negative predictions obtained against the testing set may be used to detect overfitting, identify and prune features exhibiting multicollinearity, and set a classification threshold that produces a desired level of sensitivity (true positive rate) and specificity (true negative rate). A set of evaluation features that produces predicted thread lengths and/or quality metrics having values different from the actual, known thread lengths and/or quality metrics by less than a predetermined threshold amount (e.g., ±10%, ±5%, ±2%, etc.) may be selected for subsequent predicts of high-quality annotations. In this manner, the quality of annotations may be predicted even before discussions associated therewith are commenced or completed, and such annotations may also be made visible to students in other discussion groups even before discussions associated therewith in the originating discussion group are complete.

As known to those of skill in the art, random forest classifiers operate via the construction of several decision trees based on the training set, and output the class that is the mode of the classes (classification) or mean prediction (regression) of the individual trees—thereby correcting for potential overfitting of the training set. Other text-analytic techniques, as noted above, may be utilized by the analysis engine 235 to determine evaluation features that predict thread lengths and/or quality metrics associated with the annotations in the testing group. As shown in FIG. 3, this predictive procedure may be repeated one or more times to refine the machine-learning model to include an ensemble of evaluation features (i.e., classifiers extracted from the seed features) that most accurately predicts the thread lengths and/or quality metrics associated with annotations in the testing set, or an ensemble of evaluation features that at least predicts the thread lengths and/or quality metrics to within a desired level of accuracy.

After development of the model, in step 335, new student annotations from a discussion group are received by the server 180. For example, such annotations may include annotations related to a subsequent exercise or received from a different discussion group of students 140 than those whose annotations were utilized to define the evaluation features and thus generate the machine-learning model. Using the evaluation features, the analysis engine 235 predicts the quality of the new annotations in step 340. As shown in FIG. 3, any high-quality annotations identified in step 340 may also be made visible to other students not within the discussion group from which the newly identified annotations were generated.

In various embodiments, one or more discussion groups may be redefined based upon annotations produced within one discussion group and made visible to students within one or more other discussion groups. For example, one or more such annotations may elicit high-quality annotations from one or more students in different discussion groups, and such students may be assigned to the same discussion group for subsequent lessons. Such embodiments of the invention may thus identify and group students that respond particularly well to annotations of students not initially in their discussion group(s).

In various embodiments of the invention, the high-quality annotations identified in step 315 may be utilized to highlight for the instructor 120 topics or portions of the educational resource found to be confusing by the students 140 and/or which elicited the most discussion by the students 140. For example, the annotations may be ranked and clustered, and presented in a manner that facilitates convenient access to the posts and the source material to which they relate. For example, embodiments of the invention may generate confusion reports that highlight and summarize what the students 140 found the most confusing in the reading, thereby helping the instructor prepare and use classroom time wisely. More broadly, the confusion report may contain all high-quality annotations (or an arbitrary number of them), whether they indicate confusion or correct understanding.

Referring back to FIG. 3, in step 345, the analysis engine 235 may computationally analyze the high-quality annotations in order to identify clusters relating to the same portion or related portions of the educational resource (e.g., relating to the same topic or related topics). For example, the analysis engine 235 may apply natural-language processing to the high-quality annotations and/or to the portions of the resource with which they are associated in order to cluster the annotations on the basis of subject matter. Thus, a statistical metric such as TF/IDF may be applied to the annotations to identify subject-specific vocabulary that is used to identify and cluster related annotations. Alternatively or in addition, the annotations may be clustered based on the location(s) of the annotations within the resource; for example, online discussion boards may be partitioned by course segment and/or topic, and annotations within each partition form a duster.

In step 350, the analysis engine 235 may extract and/or summarize text from the annotations of each cluster that is indicative of the topic to which the annotations in each cluster relate. To perform this step, the analysis engine 235 may utilize topic modeling with a non-negative matrix factorization algorithm. Such algorithms are well-known and may be implemented without undue experimentation (see, e.g., Cichocki et al., Nonnegative Matrix and Tensor Factorizations (John Wiley & Sons 2009), the entire disclosure of which is incorporated by reference herein).

In step 355, the analysis engine 235 produces one or more confusion reports based on the clusters of annotations identified in step 345 and the text produced in step 350. For example, the confusion report may include a machine-generated summary of the high-quality annotations (e.g., questions students asked about an online text), and may further include extracted, intact portions of the pertinent resource. The summary may be in the form of short phrases or descriptions that summarize the concept or point of confusion. Clickable links to the resource and/or annotations may also be provided. In some embodiments, the confusion report includes figures and formatting to reproduce the "look and feel" of the resource.

In some embodiments, clusters of annotations and ancillary material (i.e., portions of annotations and/or material drawn from the educational resource, as well as, in some cases, links thereto) relating to a single topic or resource portion are presented in the form of a panel, several of which may be contained in a single confusion report. The instructor may be able to edit the confusion report, e.g., to add text or figures, drag panels around, turn them into thumbnails, and annotate them further in order to prepare for efficient use of classroom time.

A panel may include links to the annotations, and may sync, in real-time, with recently added annotations. If a student 140 adds a new annotation that falls into one of the categories summarized in the report, it (or a link to it) may automatically appear in the relevant panel. Each panel may be presented in its full format or in a thumbnail format, as well as with an automated text summary of the content of the annotations on that panel and similar student annotations elsewhere. This format informs the instructor not only of areas where students have engaged significantly with the material (out of confusion or otherwise), but also allows the instructor to go into the classroom prepared to engage with his students by calling on them by name and referring back to their specific comments. The use of high-quality annotations to produce the confusion report will tend to improve the quality of the class conversation and the instruction provided by the instructor.

The resource-management module 230 and analysis engine 235 (and, e.g., a communications module within or corresponding to network interface 205) may be implemented by computer-executable instructions, such as program modules, that are executed by a conventional computer. Generally, program modules include routines, programs, objects, components, data structures, etc. that performs particular tasks or implement particular abstract data types. Those skilled in the art will appreciate that embodiments of the invention may be practiced with various computer system configurations, including multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote computer-storage media including memory storage devices.

Any suitable programming language may be used to implement without undue experimentation the analytical functions described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Regression-based models (e.g., logistic regression, classification trees and random forests) are readily implemented in the R programming language without undue experimentation (using, e.g., the rpart and randomForest libraries), and neural networks may be implemented in Python or MATLAB. Further, it is not necessary that a single type of instruction or programming language be utilized in conjunction with the operation of embodiments of the invention. Rather, any number of different programming languages may be utilized as is necessary or desirable.

The server 180 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing units that execute commands and instructions may be general-purpose processors, but may utilize any of a wide variety of other technologies including special-purpose hardware, a microcomputer, mini-computer, mainframe computer, programmed microprocessor, microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of the invention.

Communication may occur over the Internet, as illustrated, and/or over an intranet, extranet, Ethernet, the public telecommunications infrastructure, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of increasing productivity of a discussion server hosting online discussions in connection with an educational resource provided to students over network-connected devices, the method comprising the steps of:
    (a) distributing an interactive educational resource over a network to a plurality of student devices, the student devices being associated with students enrolled in a class utilizing the educational resource;
    (b) providing a discussion server configured to host a plurality of different online discussions;
    (c) hosting, at a discussion server, an online discussion for receiving and making visible, to student devices assigned to a first discussion group, annotations concerning the educational resource and received by the discussion server from the student devices assigned to the first discussion group;
    (d) computationally analyzing the annotations to identify high-quality annotations likely to generate responses and stimulate discussion threads based on at least one of historical performance, average word length, or word sophistication; and
    (e) making the identified annotations visible to student devices associated with students assigned to one or more second discussion groups to improve quality of annotations received by the discussion server from student devices assigned to the one or more second discussion groups and increase a proportion of generative and argumentative discussion threads in online discussions associated with the one or more second discussion groups, thereby increasing productivity of the discussion server.

2. The method of claim 1, further comprising, prior to step (d):
    receiving an initial set of annotations at the discussion server, each of the initial set of annotations having a discussion thread associated therewith, wherein at least a portion of the initial set of annotations constitutes a training set;
    extracting portions of annotations within the training set, thereby producing a plurality of seed features; and
    computationally deriving, from the seed features, one or more evaluation features predictive of thread lengths of discussion threads associated with annotations in the training set.

3. The method of claim 2, wherein step (d) comprises using a machine-learning model to predict a thread length associated with each annotation based on the one or more evaluation features, the model being predictive in accordance with a prediction algorithm and generated by steps comprising:
    dividing the initial set of annotations into the training set and a testing set, each of the training set and the testing set comprising a plurality of annotations and thread lengths associated therewith; and
    in accordance with the prediction algorithm, identifying the one or more evaluation features having a predictive reliability metric exceeding a threshold.

4. The method of claim 3, further comprising the steps of:
    computationally predicting, based on the one or more evaluation features, thread lengths for one or more annotations within the testing set; and
    adjusting parameters of the model based on the predictions prior to computationally analyzing annotations not within the testing set or training set to identify high-quality annotations.

5. The method of claim 3, wherein the prediction algorithm is a classification tree.

6. The method of claim 5, wherein the prediction algorithm is a random forest comprising a plurality of regression trees.

7. The method of claim 2, wherein producing the plurality of seed features comprises applying natural-language processing to annotations within the training set.

8. The method of claim 1, wherein the discussion server hosts a plurality of simultaneous discussions each visible only to a discussion group consisting of a subset of the students enrolled in the class.

9. The method of claim 1, wherein the first and second discussion groups each comprise a different subset of students simultaneously enrolled in the class.

10. The method of claim 1, wherein the first discussion group corresponds to a first session of the class and the second discussion group comprises students enrolled in a second, subsequent session of the class.

11. The method of claim 1, further comprising, after step (d):
    computationally identifying clusters of high-quality annotations relating to a same portion or related portions of the educational resource;
    for each cluster, extracting and summarizing text from the annotations indicative of a topic to which the annotations relate; and
    combining, in an electronically represented document, the extracted and summarized text and (i) at least some of the annotations and the identified portion or portions of the educational resource or (ii) clickable links thereto.

12. The method of claim 11, wherein the text from each of the clusters is represented in the document in the form of a panel.

13. The method of claim 1, further comprising, after step (d), redefining the first discussion group to include one or more students not assigned to the first discussion group in step (c).

14. An educational system comprising:
    a plurality of student devices for executing an interactive educational resource received over a network, the student devices being configured to receive student annotations associated with the educational resource and transmit at least some of the annotations to a discussion server;
    a computer memory;
    a student database;
    a resource server in electronic communication with the student devices, the resource server comprising a communication module and being configured to make the resource available to student devices associated with students enrolled in a class;
    a discussion server, in electronic communication with the student devices and configured to host a plurality of different online discussions, for receiving and making visible, to student devices assigned to a first discussion group in the student database, annotations concerning the educational resource and received from the student devices assigned to the first discussion group; and
    stored in the computer memory, an analysis module for computationally analyzing the annotations to identify high-quality annotations likely to generate responses and stimulate discussion threads based on at least one of historical performance, average word length, or word sophistication, wherein the discussion server is configured to make the identified annotations visible to student devices associated with students assigned to one or more second discussion groups to improve quality of annotations received by the discussion server from student devices assigned to the one or more second discussion groups and increase a proportion of generative and argumentative discussion threads in online discussions associated with the one or more second discussion groups, thereby increasing productivity of the discussion server.

15. The system of claim 14, wherein the analysis module is configured to:

extract portions of annotations within a training set of annotations, thereby producing a plurality of seed features; and computationally derive, from the seed features, one or more evaluation features predictive of thread lengths of discussion threads associated with annotations in the training set.

16. The system of claim 15, wherein the analysis module uses a machine-learning model to predict a thread length associated with each annotation based on the one or more evaluation features, the model being predictive in accordance with a prediction algorithm and generated by steps comprising:

dividing an initial set of annotations into the training set and a testing set, each of the training set and the testing set comprising a plurality of annotations and thread lengths associated therewith; and in accordance with the prediction algorithm, identifying the one or more evaluation features having a predictive reliability metric exceeding a threshold.

17. The system of claim 16, wherein the analysis module is configured to:

computationally predict, based on the one or more evaluation features, thread lengths for one or more annotations within the testing set; and adjust parameters of the model based on the predictions.

18. The system of claim 16, wherein the prediction algorithm is a classification tree.

19. The system of claim 18, wherein the prediction algorithm is a random forest comprising a plurality of regression trees.

20. The system of claim 15, wherein the analysis module is configured to produce the plurality of seed features by applying natural-language processing to annotations within the training set.

21. The system of claim 14, wherein the discussion server hosts a plurality of simultaneous discussions each visible only to a discussion group consisting of a subset of the students enrolled in the class.

22. The system of claim 14, wherein the first and second discussion group each comprise a different subset of students simultaneously enrolled in the class.

23. The system of claim 14, wherein the first discussion group corresponds to a first session of the class and the second discussion group comprises students enrolled in a second, subsequent session of the class.

24. The system of claim 14, wherein the analysis module is configured to:

computationally identify clusters of high-quality annotations relating to a same portion or related portions of the educational resource;

for each cluster, extract and summarize text from the annotations indicative of a topic to which the annotations relate; and combine, in an electronically represented document, the extracted and summarized text and (i) at least some of the annotations and the identified portion or portions of the educational resource or (ii) clickable links thereto.

* * * * *